United States Patent
Su et al.

(10) Patent No.: US 11,870,482 B2
(45) Date of Patent: Jan. 9, 2024

(54) WIRELESS TRANSCEIVER

(71) Applicant: ASUSTeK COMPUTER INC., Taipei (TW)

(72) Inventors: Wei-Shao Su, Taipei (TW); Chi-Hsien Chiu, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 17/515,655

(22) Filed: Nov. 1, 2021

(65) Prior Publication Data

US 2022/0149884 A1    May 12, 2022

(30) Foreign Application Priority Data

Nov. 12, 2020  (TW) .................... 109139604

(51) Int. Cl.
| H04B 1/40 | (2015.01) |
| --- | --- |
| H04B 1/713 | (2011.01) |
| H04B 1/3805 | (2015.01) |
| H04B 1/7136 | (2011.01) |

(52) U.S. Cl.
CPC ............ *H04B 1/40* (2013.01); *H04B 1/3805* (2013.01); *H04B 1/713* (2013.01); *H04B 2001/71362* (2013.01)

(58) Field of Classification Search
CPC ........ H04B 1/3805; H04B 1/40; H04B 1/713; H04B 2001/71362
See application file for complete search history.

(56) References Cited

U.S. PATENT DOCUMENTS

| 7,835,427 B1* | 11/2010 | Chavez | H04B 1/713 375/132 |
| --- | --- | --- | --- |
| 8,260,214 B2 | 9/2012 | Marlett et al. | |
| 9,939,869 B2 | 4/2018 | Rabii et al. | |
| 2007/0129104 A1* | 6/2007 | Sano | H04B 7/0805 455/553.1 |
| 2013/0045010 A1* | 2/2013 | Mukai | H04J 3/0688 398/52 |
| 2015/0017920 A1* | 1/2015 | Liu | H01Q 3/40 455/88 |
| 2015/0162972 A1* | 6/2015 | Song | H04B 1/0064 455/553.1 |
| 2019/0393932 A1* | 12/2019 | Hsu | H04B 1/713 |
| 2021/0091821 A1* | 3/2021 | Chen | H04B 3/52 |

FOREIGN PATENT DOCUMENTS

| CN | 110098880 A | 8/2019 |
| --- | --- | --- |
| CN | 209821370 U | 12/2019 |
| CN | 107407956 B | 4/2020 |

* cited by examiner

*Primary Examiner* — Nguyen T Vo
(74) *Attorney, Agent, or Firm* — McClure, Qualey & Rodack, LLP

(57) ABSTRACT

A wireless transceiver for pairing and connecting to a plurality of wireless devices is provided. The wireless transceiver includes an antenna module, a power divider, and a plurality of RF chips. The antenna module is communicated to the wireless device. The power divider is electrically connected to the power divider, the RF chips are individually paired with one of the wireless devices, and each one of the RF chips and its paired wireless device have at least one same frequency channel, a wireless signal corresponding to the wireless device is sent and received through the power divider and the antenna module after the radio frequency (RF) chip and the wireless device are successfully paired.

7 Claims, 3 Drawing Sheets

WIRELESS TRANSCEIVER

CROSS-REFERENCE TO RELATED APPLICATION

This application claims the priority benefit of Taiwan applications serial No. 109139604, filed on Nov. 12, 2020. The entirety of the above-mentioned patent application is hereby incorporated by reference herein and made a part of specification.

BACKGROUND OF THE INVENTION

Field of the Invention

The invention relates to a wireless transceiver.

Description of the Related Art

Generally, a wireless receiver includes a single RF chip with a matching circuit and an antenna to pair with a wireless device. When there is only one paired wireless device, even if the wireless device fills up packets in the time domain transmission, the wireless device still can reach its maximum polling rate. However, when the paired number of the wireless devices increases while the single RF chip of the wireless receiver is required to support the multiple paired wireless devices at the same time, the wireless receiver processes the packet data sequentially, and resources are assigned to each paired wireless device in the time domain and each paired wireless device is limited by the packet return speed, which limits the polling rate of the paired wireless device and cannot reach its maximum polling rate, which fails to achieve the best performance and reduces user experience.

BRIEF SUMMARY OF THE INVENTION

According to an aspect of the disclosure, a wireless transceiver adapted to pair and connect to a plurality of wireless devices is provided. The wireless transceiver includes an antenna module, a power divider, and a plurality of RF chips. The antenna module is communicated to the wireless device. The power divider is electrically connected to the power divider, the RF chips are individually paired with one of the wireless devices, and each one of the RF chips and its paired wireless device have at least one same frequency channel, a wireless signal corresponding to the wireless device is sent and received through the power divider and the antenna module when the radio frequency (RF) chip and the wireless device are successfully paired.

In summary, multiple RF chips with the power divider and the antenna module are configured to pair with multiple wireless devices at the same time, different frequency channels in the frequency domain are assigned to the wireless device, to reduce the chance of mutual interference caused by frequency overlap, and then cooperate with the isolation of the power divider itself to suppress the power coupling inside the wireless transceiver. Therefore, the wireless transceiver can process the wireless signals of multiple wireless devices at the same time without sacrificing the highest polling rate, allowing each of the wireless devices to maximize its performance and providing users with a better experience.

These and other features, aspects and advantages of the present invention will become better understood with regard to the following description, appended claims, and accompanying drawings.

DETAILED DESCRIPTION OF THE EMBODIMENTS

Figure 1:
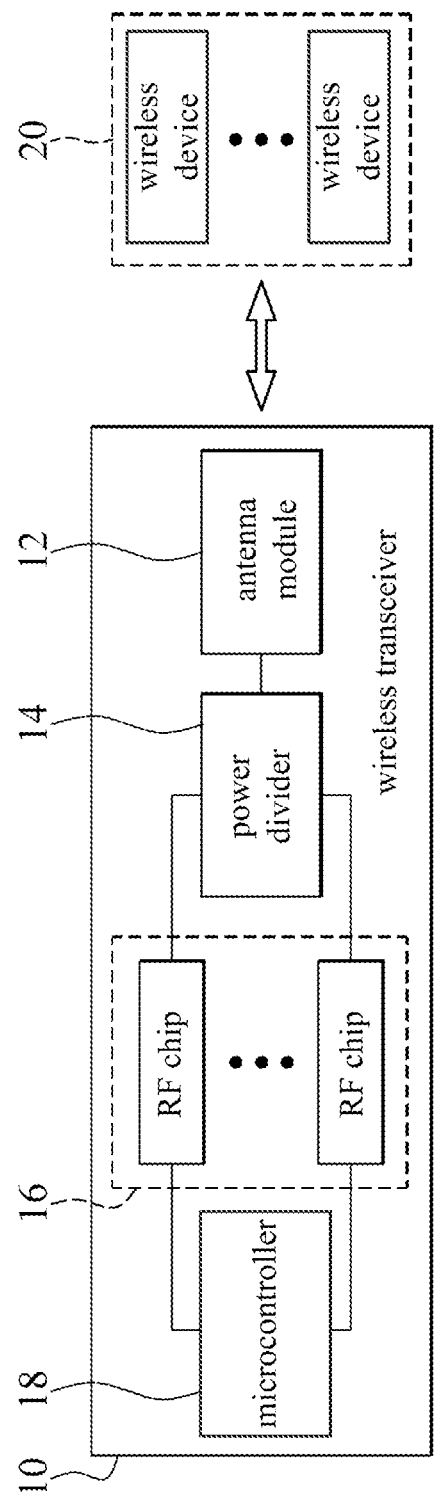
FIG. 1 is a block diagram of a wireless transceiver according to an embodiment.

FIG. 1 is a block diagram of a wireless transceiver according to an embodiment. Please refer to FIG. 1, a wireless transceiver 10 is adapted to pair with a plurality of wireless devices 20. The wireless transceiver 10 includes an antenna module 12, a power divider 14, a plurality of radio frequency (RF) chips 16, and a microcontroller 18. The antenna module 12 is communicated with the wireless device 20 to transmit and receive the wireless signal. In an embodiment, the wireless signal is 2.4 GHz frequency band. The power divider 14 is electrically connected to the antenna module 12 and a plurality of RF chips 16, and the RF chips 16 share the power divider 14 and the antenna module 12. Each RF chip 16 is individually paired with a wireless device 20, and the RF chip 16 and the wireless device 20 are one by one correspondence. Each RF chip 16 and its paired wireless device 20 have at least one same frequency channel, and different RF chips 16 have different frequency channels to prevent signal interference between different RF chips 16. When the RF chip 16 is successfully paired with the wireless device 20, the wireless signal corresponding to the wireless device 20 is transmitted and received through the power divider 14 and the antenna module 12. The wireless signal here includes the wireless signal received from the wireless device 20 and the wireless signal transmitted by the wireless device 20. The microcontroller 18 is electrically connected to all of the RF chips 16 and controls the RF chips 16, so as to efficiently sequence, control, and process the wireless signals sent and received by each RF chip 16.

In one embodiment, each RF chip 16 and its paired wireless device 20 have a same hopping frequency table, and different RF chips 16 have different sets of the hopping frequency table. The hopping frequency table includes information about the frequency channels for establishing connections, and these frequency channels are arranged in a frequency interval. That is to say, the frequency channels of different sets of the RF chip 16 and the wireless device 20 in the hopping frequency table are different for each pair to avoid mutual interference.

In one embodiment, the RF chip 16 is a system-on-chip (SoC).

In one embodiment, the wireless device 20 is any combination of wireless peripheral devices such as a wireless mouse, a wireless keyboard, a wireless headphones, a wireless speaker, a wireless microphone, or a wireless game joystick. The wireless transceiver 10 corresponds to the wireless mouse, the wireless keyboard, the wireless headphones, the wireless speaker, the wireless microphone, or the wireless game joystick.

Figure 2:
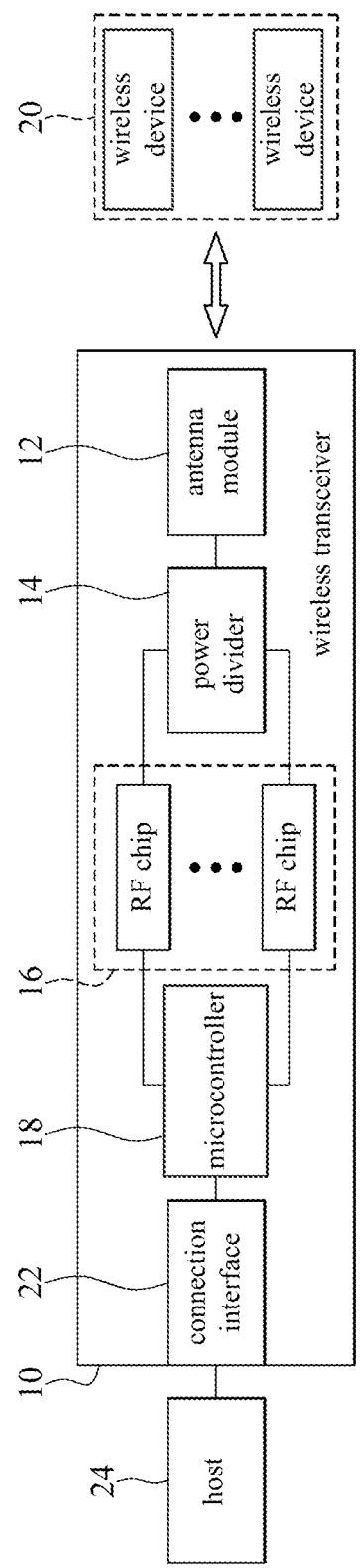
FIG. 2 is a block diagram of a wireless transceiver according to another embodiment.

Please refer to FIG. 2, the wireless transceiver 10 further includes a connection interface 22, which is electrically connected to the microcontroller 18, and the microcontroller 18 is electrically connected to a the host 24 through the connection interface 22. In one embodiment, the connection interface 22 is a USB (Universal Serial Bus) connection interface, which is not limited herein. When the wireless transceiver 10 is plugged into the host 24 through the connection interface 22 to form an electrical connection, the host 24 establishes a pairing connection between the RF chip 16 and the corresponding wireless device 20. In one embodiment, during the pairing process of the host 24, the hopping frequency table in the RF chip 16 and the wireless device 20 is updated according to actual needs, so as to rewrite the new hopping frequency table for connection to the RF chip 16 and its corresponding wireless device 20 to complete the pairing. In an embodiment, the host 24 is a notebook computer, a tablet computer, a desktop computer, which is not limited herein.

In one embodiment, the wireless transceiver 10 paired with two wireless devices 20 is taken as an example to describe the connection relationship of the components and the transmission relationship of the signals more detail. Please refer to FIG. 3. In order to signal connect the wireless transceiver 10 with the first wireless device 201 and the second wireless device 202, the wireless transceiver 10 is provided with two RF chips 16 (the first RF chip 161 and the second RF chip 162). The first RF chip 161 and the second RF chip 162 are electrically connected to the power divider 14 and the microcontroller 18, and the power divider 14 is also electrically connected to the antenna module 12. The antenna module 12 further includes an antenna 121 and an impedance matching circuit 122, and the impedance matching circuit 122 is electrically connected to the antenna 121 and the power divider 14. In the same wireless transceiver 10, since the hopping frequency table set in the first RF chip 161 is the same as the hopping frequency table set in the corresponding first wireless device 201, the first RF chip 161 is paired with the corresponding first wireless device 201. Furthermore, since the hopping frequency table set in the second RF chip 162 is the same as the hopping frequency table in the corresponding second wireless device 202, the second RF chip 162 is paired with the corresponding second wireless device 202.

Figure 3:
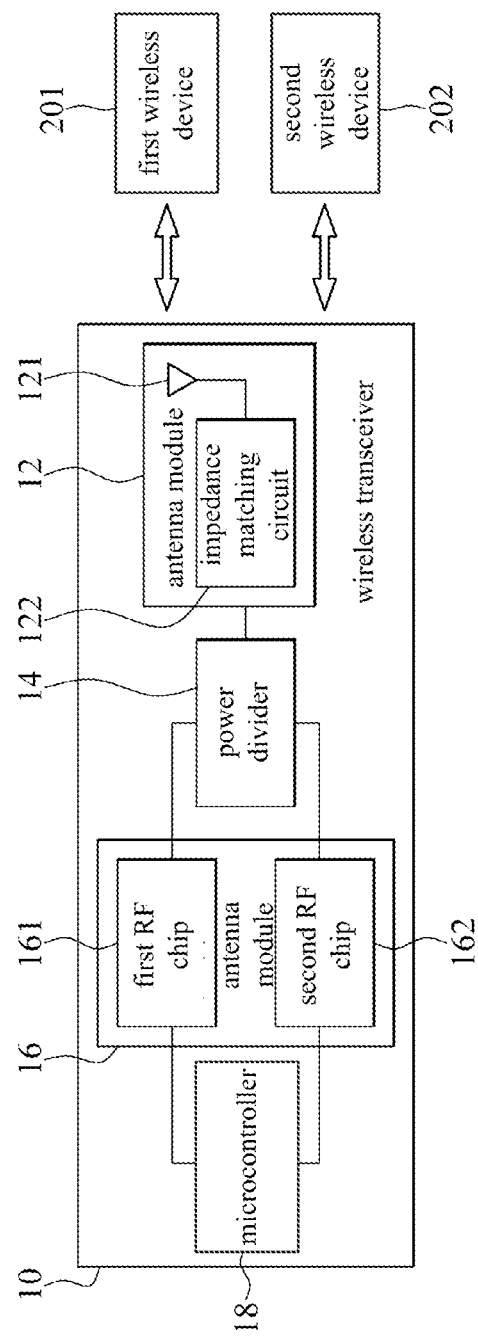
FIG. 3 is a schematic block diagram of a wireless transceiver paired with two wireless devices according to an embodiment.

Please refer to FIG. 3. When the wireless transceiver 10 serves as a receiving end, the wireless signal transmitted by the first wireless device 201 and the second wireless device 202 is coupled by the antenna 121, and the energy loss of the signal transmission between the power divider 14 and the antenna 121 is minimized through the impedance matching circuit 122. In one embodiment, the impedance matching circuit 122 is a bridge circuit element, usually composed of a combination of resistors, capacitors, and inductors. And because of different frequencies, the most suitable combination is paired, which reduces energy loss while the wireless signal passes through the antenna 121 and the power divider 14, achieving high efficiency energy transmission. Then use the power divider 14 to separately transmit the wireless signal to the first RF chip 161 and the second RF chip 162 with the same power, so that the first RF chip 161 receives the wireless signal from the first wireless device 201 and the second RF chip 162 receives the wireless signal from the second wireless device 202, which makes the first RF chip 161 and the second RF chip 162 process the wireless signal synchronously through isolations between the different hopping frequency tables and the power divider 14. In one embodiment, when the antenna module 12 receives the wireless signals (from the first wireless device 201 and the second wireless device 202) with the same power but different frequencies (such as 2402 MHz and 2480 MHz) at the same time, the power divider 14 divides the energy of the two wireless signals evenly and transmits them to the first RF chip 161 and the second RF chip 162. Although the first RF chip 161 receives two wireless signals at the same time, it only recognizes the wireless signal corresponding to its own frequency (such as 2402 MHz) according to the frequency channel (the hopping frequency table). Similarly, although the second RF chip 162 also receives two wireless signals at the same time, it only recognizes the wireless signal corresponding to its own frequency (for example, 2480 MHz) according to the frequency channel (the hopping frequency table).

Please refer to FIG. 3. When the microcontroller 18 transmits data to the first wireless device 201, the wireless signal generates by the first RF chip 161, passes through the power divider 14 and the impedance matching circuit 122 in sequence, and transmits through the antenna 121. At this time, only the paired first wireless device 201 receives the wireless signal. Similarly, when the microcontroller 18 transmits data to the first wireless device 202, the wireless signal generates by the second RF chip 162, passes through the power divider 14 and the impedance matching circuit 122 in sequence, and transmitted through the antenna 121. At this time, only the paired second wireless device 202 receives the wireless signal. Therefore, in the wireless transceiver 10, in terms of time domain, the first RF chip 161 and the second RF chip 162 are used differently, to effectively process the transmission and reception of the wireless signal simultaneously, thereby achieving the best performance.

In one embodiment, the hopping frequency table is tested and established by the system development end. Taking the wireless transceiver 10 with two sets of the RF chip 16 shown in FIG. 3 as an example, when establishing the hopping frequency table, fix the frequency of the first RF chip 161 firstly; then set the frequency of the second RF chip 162 to be adjacent to the frequency of the first RF chip 161 (for example, the interval between the frequency of the second RF chip 162 and the frequency of the first RF chip 161 is 1 MHz), and let the first RF chip 161 and the second RF chip 162 transmit signals with the same power and determine whether the signal of the first RF chip 161 and the signal of the second RF chip 162 interfere with each other according to the bit error rate (BER) standard; when it is determined that the signal of the first RF chip 161 and the signal of the second RF chip 162 interfere with each other, increase the frequency interval between the second RF chip 162 and the first RF chip 161 until the signal of the first RF chip 161 and the signal of the second RF chip 162 do not interfere with each other, to calculate the appropriate frequency interval between the first RF chip 161 and the second RF chip 162. According to the frequency interval, select the applicable hopping frequency in the operating frequency band (2.4 GHz frequency band) to establish the hopping frequency table suitable for multiple RF chips 16 to receive and transmit signals at the same time. In one embodiment, as the hopping frequency table shown in Table 1, the hopping frequency table used by the first RF chip 161 and the first wireless device 201 includes 6 frequency channels such as 2402 MHz, 2416 MHz, 2430 MHz, 2444 MHz, 2458 MHz, and 2472 MHz, and the hopping frequency table used by the second RF chip 162 and the second wireless device 202 includes 6 frequency channels such as 2409 MHz, 2423 MHz, 2437 MHz, 2451 MHz, 2465 MHz, 2480 MHz.

Overall, the frequency hopping between the adjacent frequency channels is 7 MHz. Similarly, as shown in the hopping frequency table in Table 2, the hopping frequency table used by the first RF chip 161 and the first wireless device 201 includes 7 frequency channels such as 2402 MHz, 2414 MHz, 2426 MHz, 2438 MHz, 2450 MHz, 2462 MHz, 2474 MHz, and the hopping frequency table used by the second RF chip 162 and the second wireless device 202 includes 7 frequency channels such as 2408 MHz, 2420 MHz, 2432 MHz, 2444 MHz, 2456 MHz, 2468 MHz, 2480 MHz. On the whole, the frequency hopping between adjacent the frequency channel is 6 MHz. As shown in the hopping frequency table in Table 3, the hopping frequency table used by the first RF chip 161 and the first wireless device 201 includes 8 hopping frequency channels such as 2402 MHz, 2412 MHz, 2422 MHz, 2432 MHz, 2442 MHz, 2452 MHz, 2462 MHz, 2472 MHz, the hopping frequency table used by the second RF chip 162 and the second wireless device 202 includes 8 frequency channels such as 2407 MHz, 2417 MHz, 2427 MHz, 2437 MHz, 2447 MHz, 2457 MHz, 2467 MHz, 2480 MHz. Overall, the frequency hopping between adjacent the frequency channel is 5 MHz.

TABLE 1

| | the frequency channel (MHz) | | | | | |
|---|---|---|---|---|---|---|
| the first wireless device | 2402 | 2416 | 2430 | 2444 | 2458 | 2472 |
| the second wireless device | 2409 | 2423 | 2437 | 2451 | 2465 | 2480 |

TABLE 2

| | the frequency channel (MHz) | | | | | | |
|---|---|---|---|---|---|---|---|
| the first wireless device | 2402 | 2414 | 2426 | 2438 | 2450 | 2462 | 2474 |
| the second wireless device | 2408 | 2420 | 2432 | 2444 | 2456 | 2468 | 2480 |

TABLE 3

| | the frequency channel (MHz) | | | | | | | |
|---|---|---|---|---|---|---|---|---|
| the first wireless device | 2402 | 2412 | 2422 | 2432 | 2442 | 2452 | 2462 | 2472 |
| the second wireless device | 2407 | 2417 | 2427 | 2437 | 2447 | 2457 | 2467 | 2480 |

Continuing, please refer to FIG. 3 and Table 1 to Table 3. Since the hopping frequency tables and the frequency channels in the table used by the first RF chip 161 and the first wireless device 201 and that used by the second RF chip 162 and the second wireless device 202 are completely different, when the first RF chip 161 uses any one of the frequency channels in the built-in hopping frequency table to successfully pair with the first wireless device 201 for signal transmission, the second wireless device 202 is affected. Similarly, when the second RF chip 162 uses any one of the frequency channels in the built-in hopping frequency table to pair with the second wireless device 202 for signal transmission, the first wireless device 201 is not affected. Therefore, the wireless transceiver 10 effectively simultaneously processes the wireless signal (packet data) from the first wireless device 201 and the second wireless device 202.

In summary, multiple RF chips with the power divider and the antenna module are used to pair with multiple wireless devices at the same time, different frequency channels in the frequency domain are assigned to the wireless device, to reduce the chance of mutual interference caused by frequency overlap, and then cooperate with the isolation of the power divider itself to suppress the power coupling inside the wireless transceiver. Therefore, the wireless transceiver processes the wireless signals of multiple wireless devices at the same time without sacrificing the highest polling rate, allowing each of the wireless devices to maximize its performance and providing users with a better experience.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A wireless transceiver, adapted to pair and connect with a plurality of wireless devices, the wireless transceiver comprising:
   an antenna module, configured to communicate to the wireless device;
   a power divider, electrically connected to the antenna module; and
   a plurality of RF chips, electrically connected to the power divider, the RF chips are individually paired with one of the wireless devices, and each of the RF chips and its paired wireless device have at least one same frequency channel, a wireless signal corresponding to the wireless device is transmitted and received through the power divider and the antenna module when the radio frequency (RF) chip and the wireless device are successfully paired, and the power divider separately transmits the wireless signal with the same power to the RF chips;
   wherein each one of the RF chips and its paired wireless device have a same built-in hopping frequency table, and the different RF chips have different hopping frequency table, where the hopping frequency table includes information of multiple frequency channels for establishing connection; and the frequency channels of the hopping frequency table are arranged in a frequency interval, a applicable hopping frequency is selected in the operating frequency band according to the frequency interval.

2. The wireless transceiver according to claim 1, further comprising a microcontroller, electrically connected to the RF chips to control operations of the RF chips.

3. The wireless transceiver according to claim 2, wherein the microcontroller is also electrically connected to a host through a connection interface, so as to use the host to pair and connect between the RF chips and the wireless devices correspondingly.

4. The wireless transceiver according to claim 3, wherein the host uses the microcontroller to update the frequency channels of the RF chips and the wireless devices correspondingly.

5. The wireless transceiver according to claim 1, wherein the antenna module further comprises an antenna and an impedance matching circuit, the impedance matching circuit electrically connects to the antenna and the power divider.

6. The wireless transceiver according to claim 1, wherein the wireless signal is 2.4 GHz.

7. The wireless transceiver according to claim 1, wherein the wireless devices are any combination of a wireless mouse, a wireless keyboard, a wireless headphone, a wireless speaker, a wireless microphone, or a wireless game joystick.

* * * * *